United States Patent [19]

Hulse

[11] Patent Number: 5,533,609
[45] Date of Patent: Jul. 9, 1996

[54] FOOT WIPING APPARATUS FOR CERAMIC WARE

[75] Inventor: David K. Hulse, Stoke-on-Trent, England

[73] Assignee: Royal Doulton (UK) Limited, Stoke-on-Trent, England

[21] Appl. No.: 408,339

[22] Filed: Mar. 22, 1995

[30] Foreign Application Priority Data

Mar. 24, 1994 [GB] United Kingdom .................. 9405819

[51] Int. Cl.⁶ .................................................. B65G 47/24
[52] U.S. Cl. ...................... 198/415; 198/626.1; 198/495
[58] Field of Search ................................... 198/415, 495, 198/623, 626.1, 817, 818

[56] References Cited

U.S. PATENT DOCUMENTS

| | | | |
|---|---|---|---|
| 4,676,361 | 6/1987 | Heisler | 198/415 X |
| 5,074,402 | 12/1991 | Bender-Zanoni et al. | 198/626.1 |

FOREIGN PATENT DOCUMENTS

| | | | |
|---|---|---|---|
| 0216881 | 3/1958 | Australia | 198/415 |
| 0466278 | 1/1992 | European Pat. Off. | 198/626.1 |
| 0151523 | 9/1982 | Japan | 198/415 |
| 2224986 | 5/1990 | United Kingdom | 198/415 |
| 2256626 | 12/1992 | United Kingdom . | |

OTHER PUBLICATIONS

Search Report (Great Britain) GB 9405819.5.

*Primary Examiner*—James R. Bidwell
*Attorney, Agent, or Firm*—Watts, Hoffman, Fisher, & Heinke Co.

[57] ABSTRACT

Apparatus for foot cleaning of articles of ceramic ware comprises a conveyor device which includes a pair of belt members independently movable in the same direction at different speeds, the belt members being tilted transversely relative to one another such that their adjacent edges are lower than their outer edges. Preferably there is provided a way for varying the angle of tilt of the belt members.

6 Claims, 2 Drawing Sheets

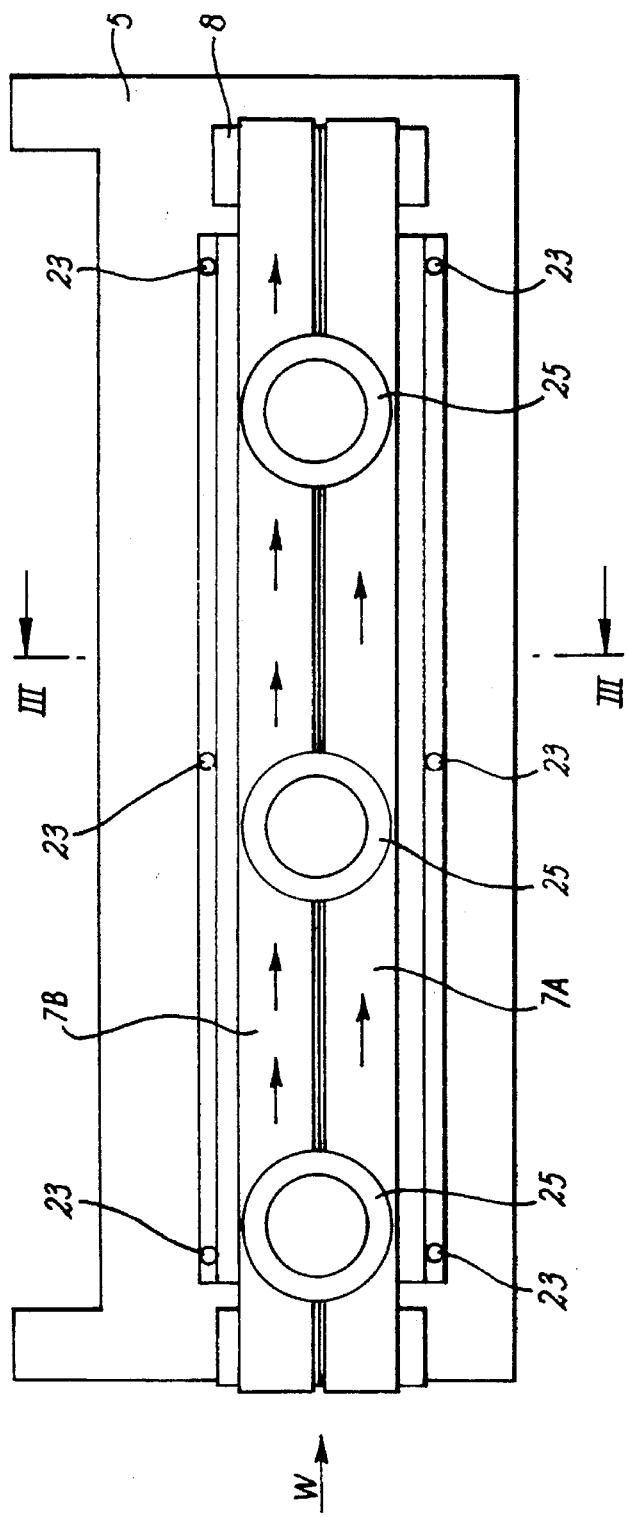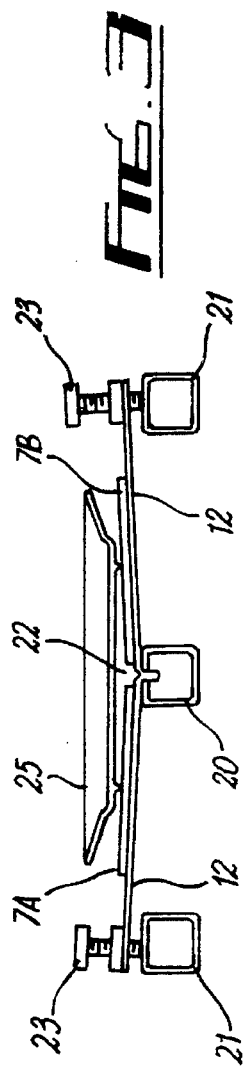

FOOT WIPING APPARATUS FOR CERAMIC WARE

This invention relates to foot wiping apparatus for ceramic ware.

In the production of ceramic plates and other glazed ceramic articles it is necessary following glazing to remove excess glaze which may have accumulated on the "foot" of the article, that is the downwardly projecting rim on the underside of the article by means of which it is supported. If glaze is allowed to accumulate on this rim the article will stick to items of kiln furniture during firing which is obviously undesirable. It is necessary therefore remove glaze from the foot during the production cycle.

According to the invention there is provided apparatus for foot cleaning of articles of ceramic ware comprising conveyor means including a pair of belt members independently movable in the same direction at different speeds, the belt members being tilted transversely relative to one another such that their adjacent edges are lower than their outer edges.

Means is preferably provided for varying the angle of tilt of the belt members.

Preferably each of said belt members has independent drive means, the apparatus including control means operable to vary the speed of operation of said respective drive means.

Preferably said belt members are provided with felt or flocked surfaces adapted to absorb glaze medium, the apparatus incorporating means for removing glaze medium transferred to the belt members from the articles of ware.

An embodiment of the invention will now be described, by way of example only, with reference to the accompanying diagrammatic drawings, in which:

FIG. 2 is a plan view of the apparatus shown in FIG. 1; and

FIG. 3 is a cross-section through pare of the apparatus on the line III—III in FIG. 2.

Figure 1:
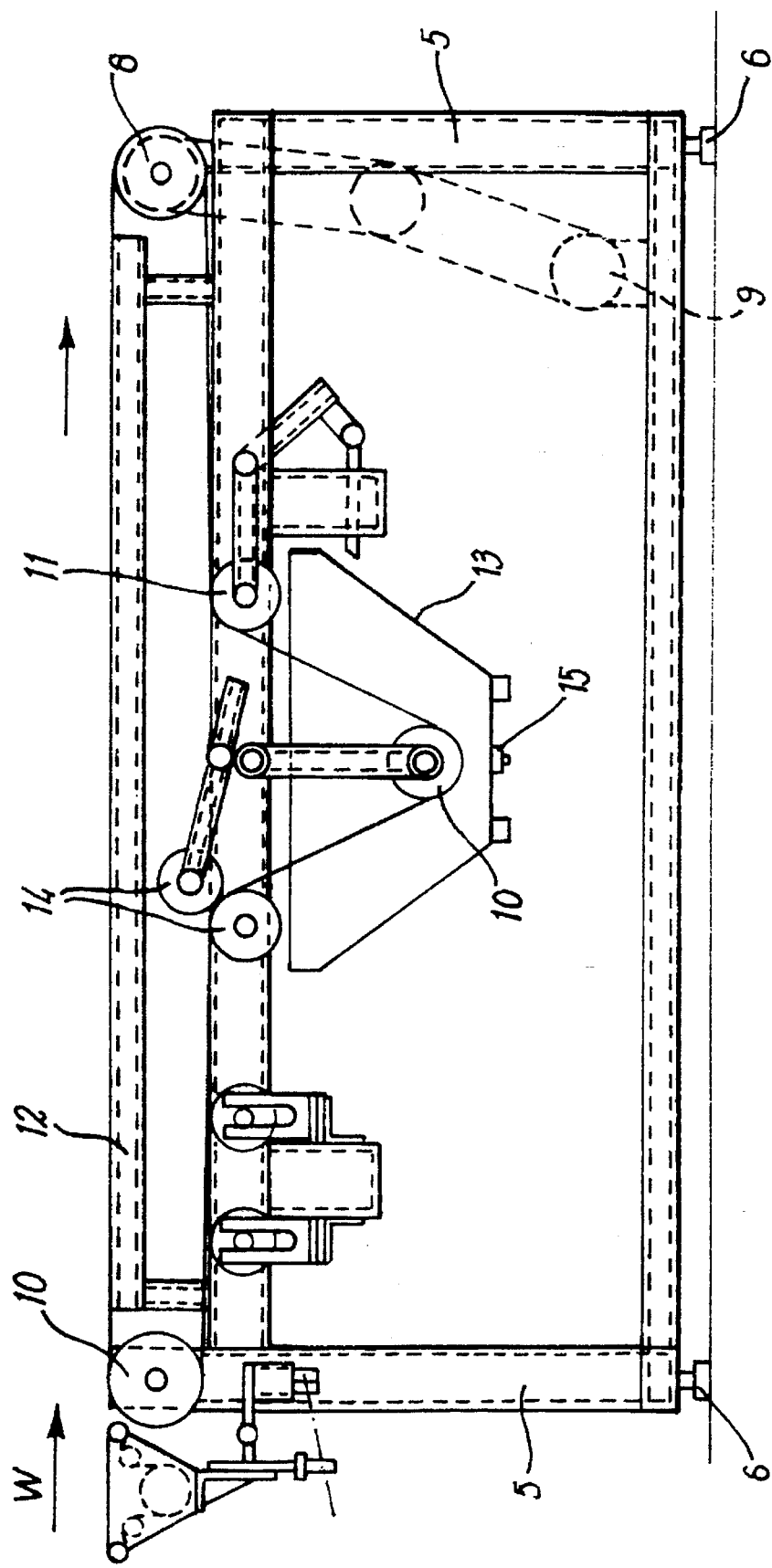
FIG. 1 is a side elevation of one form of apparatus according to the invention.

Referring to the drawings, the apparatus comprises a supporting frame 5 mounted on adjustable feet 6 and incorporating a pair of spaced parallel conveyor belts 7A and 7B. Each belt 7A,7B is driven through a drive roller 8 from a respective variable speed motor 9 and is entrained around idler rollers 10 and tensioning rollers 11. The upper runs of the two belts are supported on tracking plates 12 and the lower runs pass through a water reservoir 13 between squeegee rollers 14 which remove glaze transferred to the belts from the ware being wiped or cleaned. The glaze medium accumulates in a reservoir 13 from which it may be drained periodically through a drain valve 15.

The tracking plates 12 are supported on a common central support member 20 and a pair of respective side support members 21 and are inclined downwardly and inwardly from the side frame members as best seen in FIG. 3. The belts 7A,7B are slidably supported on the tracking plates such that their adjacent edges are lower than their outer edges, thus forming a depression 22 beneath the centre of plates 25 or other articles of ware transported on the belts. Threaded adjusters 23 are provided at intervals along the length of the outer edges of the respective tracking plates 12 to enable the angle of tilt of the tracking plates and hence the belts 7A,7B to be altered between zero and about 10° to the horizontal.

Articles of ware such as plates 25 are delivered on to the belts from a glazing line in the direction of the arrow 'W' in FIGS. 1 and 2 and are transported by the belts from left to right in the drawings. The ware is delivered from the right hand end of the belts to a collecting zone from which it is removed by hand for packing or subsequent handling. In the case of circular ware, the drive motors 9 of the respective belts 7A,7B are driven at slightly different speeds so that the upper runs of both belts, while moving in the same direction, move at different speeds, thus causing the articles of ware to rotate. This produces a wiping action on the foot of each article of ware thus removing glaze from the foot as the article is conveyed along. Because the articles are circular the difference in speed of the two belts produces rotation but does not tend to throw the articles off the conveyor. The difference in relative speed is preferably maintained in the region of 2.5:1, but could be more or less dependent on the circumstances.

In this mode of operation the apparatus may be used for wiping or cleaning the foot of plates, saucers, cups, bowls and a wide variety of other articles of circular shape in plan. However where articles of non-circular shape, such as oval plates, are being glazed, the difference in speed of the conveyor belts will not produce uniform rotation but will tend to move the articles to one side and ultimately throw them off the conveyor. Where such articles are being handled therefore, the drive motors 9 are adjusted to the same speed whereby to drive both belts at the same linear speed over the supporting plates 12. In this way non-circular articles are simply conveyed along the conveyor without rotation and excess glaze is removed from the foot manually by an operator pressing down and rotating each article in turn.

As mentioned previously, the inward tilting of the belts 7A,7B produces a depression 22 beneath the centre of the articles of ware as seen in FIG. 3. This ensures that if, instead of being flat, the base of the article surrounded by the foot is depressed, it still clears the inner edges of the belts and is not wiped. In previously proposed apparatus incorporating flat belts, glaze could be removed from the central region of the ware as well as the foot resulting in articles which were otherwise satisfactory having to be rejected following the wiping process.

Various modifications may be made without departing from the invention. For example, the general construction of the apparatus may be altered provided it incorporates at least two belts movable at different speeds, and the means for driving, tensioning and removing glaze from the belts may be altered if desired. The belts may also be provided with alternative forms of surface for contact with the ware to absorb and wipe away excess glaze. Moreover the two speed drive arrangement could be incorporated in a machine which did not have the belts tilted relative to one another.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. Apparatus for foot cleaning of articles of ceramic ware comprising conveyor means including a pair of belt members independently movable in the same direction at different speeds, the belt members being tilted transversely relative to one another such that their adjacent edges are lower than their outer edges, the surfaces of said belt members being adapted to remove glaze medium from the foot portions of the articles of ware transported on the belt members, and the apparatus including means for removing from the belt members glaze medium transferred to them from the said articles.

2. Apparatus according to claim 1 wherein means is provided for varying the angle of tilt of the belt members.

3. Apparatus according to claim 1 wherein each of said belt members has independent drive means.

4. Apparatus according to claim 3 including control means operable to vary the speed of operation of said respective drive means.

5. Apparatus for foot cleaning of articles of ceramic ware comprising conveyor means including a pair of belt members independently movable in the same direction at different speeds, the belt members being tilted transversely relative to one another such that their adjacent edges are lower than their outer edges and the surfaces of said belt members being adapted to absorb glaze medium.

6. Apparatus according to claim 5 including means for removing glaze medium transferred to the belt members from the articles of ware.

* * * * *